United States Patent
Shimada

(10) Patent No.: US 7,580,631 B2
(45) Date of Patent: Aug. 25, 2009

(54) OPTICAL TRANSMISSION DEVICE FOR CONTROLLING OPTICAL LEVEL OF TRANSMISSION SIGNAL IN OPTICAL TRANSMISSION SYSTEM

(75) Inventor: Yuji Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 477 days.

(21) Appl. No.: 11/363,166

(22) Filed: Feb. 28, 2006

(65) Prior Publication Data

US 2007/0077073 A1 Apr. 5, 2007

(30) Foreign Application Priority Data

Sep. 30, 2005 (JP) ............................. 2005-288724

(51) Int. Cl.
*H04B 10/08* (2006.01)
*H04J 14/02* (2006.01)
(52) U.S. Cl. .............................. 398/30; 398/33; 398/25; 398/79
(58) Field of Classification Search ................... 398/25, 398/30, 33, 37, 79, 31, 28, 34, 13, 14, 20, 398/16, 43
See application file for complete search history.

(56) References Cited

U.S. PATENT DOCUMENTS

| 6,433,925 B1 * | 8/2002 | Sakano et al. .......... 359/341.43 |
| 6,959,149 B2 * | 10/2005 | Bragg et al. .................. 398/26 |
| 2006/0285846 A1 * | 12/2006 | Uekama et al. ............... 398/30 |

FOREIGN PATENT DOCUMENTS

| JP | 11-17259 | 1/1999 |
| JP | 2004-147122 | 5/2004 |

* cited by examiner

*Primary Examiner*—M. R. Sedighian
(74) *Attorney, Agent, or Firm*—Staas & Halsey LLP

(57) ABSTRACT

An optical transmission device includes: an attenuator that attenuates an optical signal from an adjacent optical transmission device; an optical element that is arranged downstream of the attenuator; a detector that detects a change in a characteristic of a transmission path; and a controller that adjusts, when the change is detected, an attenuation of the attenuator to keep the level of the optical signal input to the optical element at a predetermined level.

8 Claims, 10 Drawing Sheets

OPTICAL TRANSMISSION DEVICE FOR CONTROLLING OPTICAL LEVEL OF TRANSMISSION SIGNAL IN OPTICAL TRANSMISSION SYSTEM

CROSS-REFERENCE TO RELATED APPLICATIONS

This application is based upon and claims the benefit of priority from the prior Japanese Patent Application No. 2005-288724, filed on Sep. 30, 2005, the entire contents of which are incorporated herein by reference.

BACKGROUND OF THE INVENTION

1. Field of the Invention

The present invention relates to a technology for adjusting an optical level of a transmission signal to an optimum level in an optical transmission system.

2. Description of the Related Art

Recently, the optical transmission system for performing transmission of optical signals with a high transmission rate by using an optical fiber for a transmission path, multiplexed by wavelength division multiplexing (WDM), and capable of increasing the information capacity has been popularized and used, instead of electric signals. FIG. 9 is an explanatory diagram of a configuration example of the optical transmission system.

In an optical transmission system 900, optical add-and-drop multiplexers (OADMs) A, B, E, and D, and in-line amps (ILAs) C and F are provided on a transmission path including an outer ring (upward ring) 910 and an inner ring (downward ring) 920. Transceivers 901A, 901B, 901D and 901E are connected to the OADMs A, B, D, and E, respectively, and transmission and reception of optical signals can be performed with an optional communication partner, by adding, dropping, or transmitting transmission light transmitted through the outer ring 910 and the inner ring 920. The ILAs C and F amplify a WDM beam transmitted through the outer ring 910 and the inner ring 920. The light transmitted in the optical transmission system 900 is formed of the WDM beam obtained by multiplexing the optical signal and an optical supervisory channel (OSC) beam for supervising the transmission state of the optical signal.

In the optical transmission system 900, it is important to adjust the optical level of the optical signal constituting the WDM beam to an appropriate value by the OADMs A, B, D, and E and the ILAs C and F to transmit the optical signal through the outer ring 910 and the inner ring 920.

As the conventional art relating to the adjustment of the optical level, there is a structure in which in the wavelength multiplexing optical transmission, substantially equal optical output can be obtained in each wavelength, thereby enabling insertion of an optical functional part into an intermediate portion, regardless of the level and the wavelength of the optical signal input to an optical fiber amplifier. In this case, it is important to avoid occurrence of optical surge and determine a connection of parts. Therefore, a technique is disclosed in which feedback control is performed by inserting a variable attenuator in an optical input unit, so that the optical input to the amplifying optical fiber becomes constant. Furthermore, control for changing the overall optical output and optical input to the amplifying optical fiber is performed based on the wavelength information obtained from a supervisory signal, and light to the intermediate optical part and light from the optical part are detected, and when there is no part, pumping is suppressed. By performing such control, occurrence of optical surge at the time of connection can be avoided, and a signal indicating that an optical part is not connected is output (see, for example, Japanese Patent Application Laid-Open No. H11-17259).

There is another example in which an optical wavelength multiplexing network can be easily formed. In this technique, it is important to keep constant an optical signal level for each channel, to maintain desired transmission quality. Therefore, a supervisory signal transmitted through the optical fiber transmission path is extracted by a WDM coupler, to obtain the wavelength of the optical signal input to a remote node from the supervisory signal. A feedback controller calculates the wavelength information, which is the sum of the wavelength obtained from the supervisory signal and the wavelength of an optical signal newly added at the remote node, via a supervisory signal processing circuit. Furthermore, by adjusting an attenuation of the variable optical attenuator so that a value obtained by dividing the total optical power of an optical amplifier by the value of wavelength becomes the desired optical power of the optical signal for each channel, feedback control is performed at all times with respect to the attenuation of the variable optical attenuator, to compensate loss fluctuation in the optical fiber transmission path (see, for example, Japanese Patent Application Laid-Open No. 2004-147122).

Conventionally, the control of the optical level of the optical signal is performed at the time of startup of the optical transmission system, as in Japanese Patent Application Laid-Open Nos. H11-17259 and 2004-147122. The attenuation of a reception unit is adjusted to control to the optical level to an optimum level, based on the wavelength information of the WDM beam obtained by the OSC controller equipped in the OADMs A, B, D, and E and the ILAs C and F shown in FIG. 9.

An example of the method of adjusting the optical signal level at the time of startup (activation) of the OADM or the ILA is shown below. FIG. 10 is an explanatory diagram of a startup procedure of the optical transmission system. A reception unit 1010 includes a variable optical attenuator (VOA) 1011, a front photodiode (PD) 1014 arranged upstream of the VOA 1011, a rear PD 1015 arranged downstream of the VOA 1011, an OSC branch coupler 1012, and a preamp 1013. A transmission unit 1050 includes a postamp 1051, an OSC combination coupler 1052, and a 1×2 switch (SW) 1054. The reception unit 1010 and the transmission unit 1050 further include unit controllers 1016 and 1053, respectively. The unit controller 1016 of the reception unit 1010 adjusts the attenuation of the VOA 1011 based on optical levels detected by the front PD 1014 and the rear PD 1015, to control the optical level of the optical signal input to the preamp 1013. The unit controller 1016 of the reception unit 1010 and the unit controller 1053 of the transmission unit 1050 are connected to an OSC controller 1060 (for convenience, it is written as "OSC" in the drawings, as well as an OSC controller explained below), to adjust the attenuation of the VOA 1011 at the time of startup.

An OR 1061 and an OS 1062 includes a unit controller 1063, an optoelectronic converter (OE) 1064, and an electro-optic converter (EO) 1065. The unit controller 1063 controls the OSC controller 1060. The OE 1064 converts an input optical signal to an electric signal and output the electric signal. The EO 1065 converts an input electric signal to an optical signal and output the optical signal.

The startup procedure of the OADM B connected to the outer ring 910 and the inner ring 920 is explained next. The startup of the OADM B is performed by transmitting the OSC beam between adjacent optical transmission devices (that is, OADMs A and B in the example shown in FIG. 10).

At first, an output request of amplified spontaneous emission (ASE) beam for optical level control is output from the unit controller 1063 in the OSC controller 1060 of the OADM B to the unit controller 1016 of the OADM B and the unit controller 1016 of the OADM A (S1). The optical level of the ASE beam requested at this time corresponds to one wavelength level of the optical signal. In response to the output request of the ASE beam, a 1×2 switch (SW) 1017 arranged upstream of the preamp 1013 in the OADM B is controlled to open, so that the optical signal from the OADM B is not sent out to the transmission path, thereby shutting down the input light to the OADM B.

Subsequently, communication confirmation of the OSC beam is performed in the EO 1065 of the OADM A and the OE 1064 of the OADM B (S2). The postamp 1051 having received the output request of the ASE beam outputs the ASE beam of a level corresponding to one wavelength of the optical signal (S3). At this time, a 1×2 SW 1054 arranged upstream of the postamp 1051 in the OADM A is controlled to open.

When the ASE beam is input to the reception unit 1010 of the OADM B via the outer ring 910 (S4), and further input to the unit controller 1016 via the VOA 1011, auto-adjustment of the VOA 1011 is carried out (S5). Specifically, to make the input light of the preamp 1013 at an appropriate level, the unit controller 1016 in the OADM B monitors the light-receiving power of the rear PD 1015 arranged upstream of the preamp 1013, and adjust the VOA 1011 to have an appropriate attenuation.

When the auto-adjustment of the VOA 1011 has finished, the unit controller 1016 in the OADM B determines that the input to the preamp 1013 becomes stable, to release the shutdown state of the preamp 1013 in the OADM B (S6), and starts up the preamp 1013 by automatic level control (ALC).

When having confirmed that the preamp 1013 has been started up, and shifted to automatic gain control (AGC), the unit controller 1016 in the OADM B suspends the output request of the ASE beam for optical level control from the unit controller 1063 (S7). When the output of the ASE beam from the postamp 1051 has stopped, the unit controller 1053 closes the 1×2 SW 1054 arranged upstream of the postamp 1051 in the OADM A, to release the shut-down state of the postamp 1051, and starts the operation thereof.

The auto-adjustment of the VOA 1011 carried out at S5 in FIG. 10 indicates a process for adjusting the optical level of the optical signal input to the preamp 1013 (the ASE beam at the time of startup) to be within a dynamic range of the preamp 1013.

After the startup operation as described above, the OADM A and the OADM B are in a normal operation state. The VOA 1011 fixes the attenuation for one wavelength of the optical signal, and the preamp 1013 carries out automatic gain control (AGC) to control the gain of the multiplexed optical signal to be equalized. This is because in the optical transmission system 900, it is assumed that the wavelengths of optical signals multiplexed in the WDM beam on the transmission path changes corresponding to the communication state. Therefore, even at the time of increase or decrease in the wavelengths of optical signals, the OADMs A and B can keep the level of the optical signal at an appropriate level.

However, even in the optical transmission system 900 in which optical level control is carried out by the OADMs A, B, D, and E and the ILAs C and F, if bending or an excessive temperature change occurs in the transmission path (for example, the outer ring 910 or the inner ring 920) itself, the transmission characteristic of the transmission path changes, thereby affecting the optical level of the WDM beam. When the transmission characteristic has changed, the attenuation fixed at the time of startup is attenuated as usual in the VOA 1011, since there is no change in the wavelengths of the optical signals multiplexed in the WDM beam.

As a result, the WDM beam, whose optical level has changed as compared with the optical level at the time of startup or at the time of normal operation, due to a change in the transmission characteristic of the transmission path, is input to the OADMs A, B, D, and E and the ILAs C and F. Such a WDM beam is output directly to the transmission path, with the change in the optical level being not corrected. When the optical level changes of the WDM beam are accumulated, the changes cannot fall within the dynamic range of the pre-designed input level to the OADMs A, B, D, and E and the ILAs C and F, thereby causing an error.

When the dynamic range of the input level is designed to be large, taking the changes in the transmission characteristic into consideration, the production cost of the OADMs A, B, D, and E and the ILAs C and F increases.

SUMMARY OF THE INVENTION

It is an object of the present invention to at least solve the problems in the conventional technology.

An optical transmission device according to an aspect of the present invention adjusts a level of an optical signal from an adjacent optical transmission device that is arranged upstream of the optical transmission device on a transmission path. The optical transmission device includes: an attenuator that attenuates the optical signal; an optical element that is arranged downstream of the attenuator; a detector that detects a change in a characteristic of the transmission path; and a controller that adjusts, when the change is detected, an attenuation of the attenuator to keep the level of the optical signal input to the optical element at a predetermined level.

A method according to another aspect of the present invention is a method for an optical transmission device to adjust a level of an optical signal from an adjacent optical transmission device that is arranged upstream of the optical transmission device on a transmission path. The method includes: attenuating the optical signal by an attenuator; detecting a change in a characteristic of the transmission path; and adjusting, when the change is detected, an attenuation of the attenuator to keep the level of the optical signal after being attenuated by the attenuator at a predetermined level.

A computer-readable recording medium according to still another aspect of the present invention stores a computer program for an optical transmission device to adjust a level of an optical signal from an adjacent optical transmission device that is arranged upstream of the optical transmission device on a transmission path. The computer program causes the optical transmission device to execute: attenuating the optical signal by an attenuator; detecting a change in a characteristic of the transmission path; and adjusting, when the change is detected, an attenuation of the attenuator to keep the level of the optical signal after being attenuated by the attenuator at a predetermined level.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail with reference to the accompanying drawings.

Figure 1:
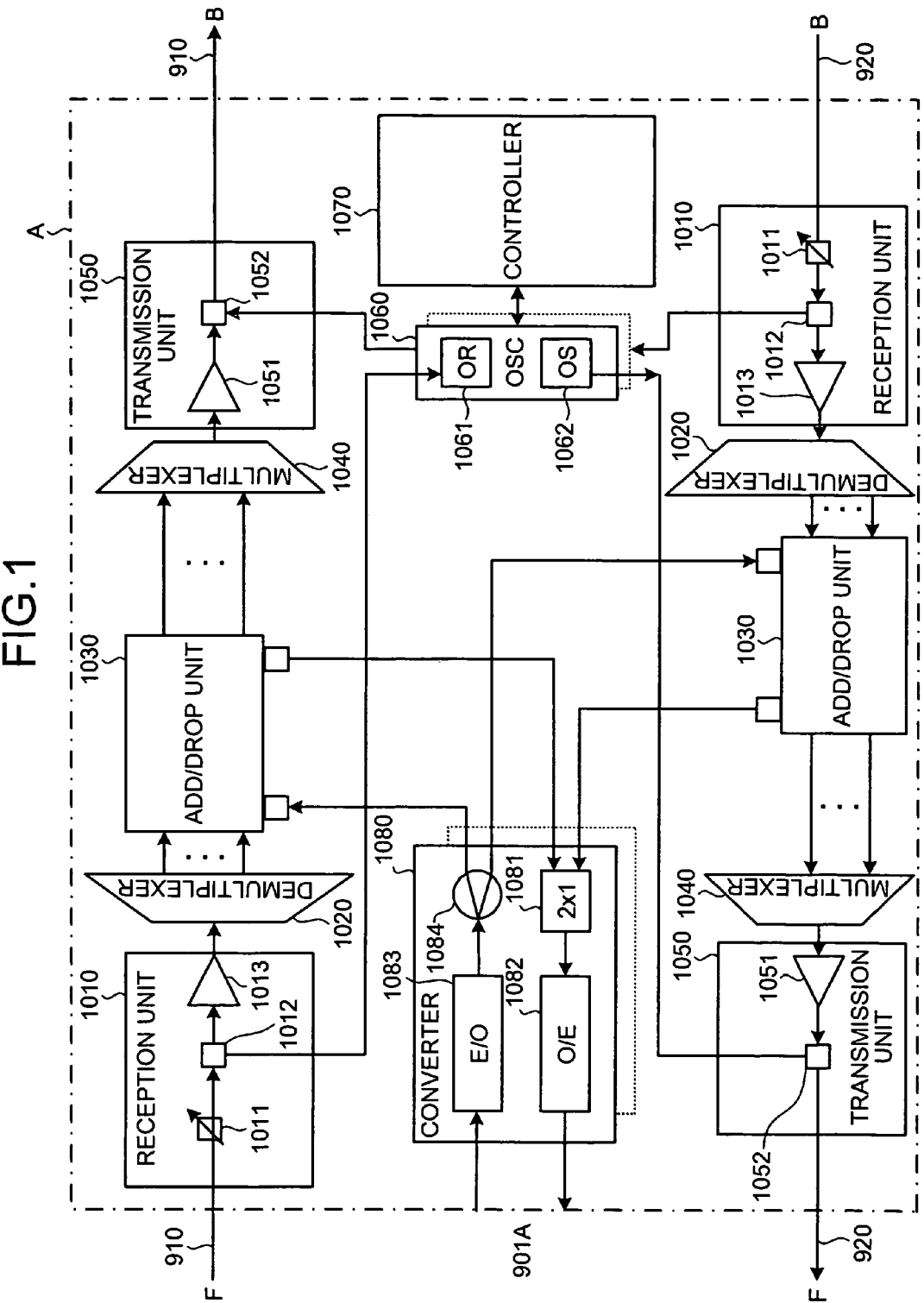
FIG. 1 is an explanatory diagram of the configuration of an optical add-and-drop multiplexer (OADM)
Figure 9:
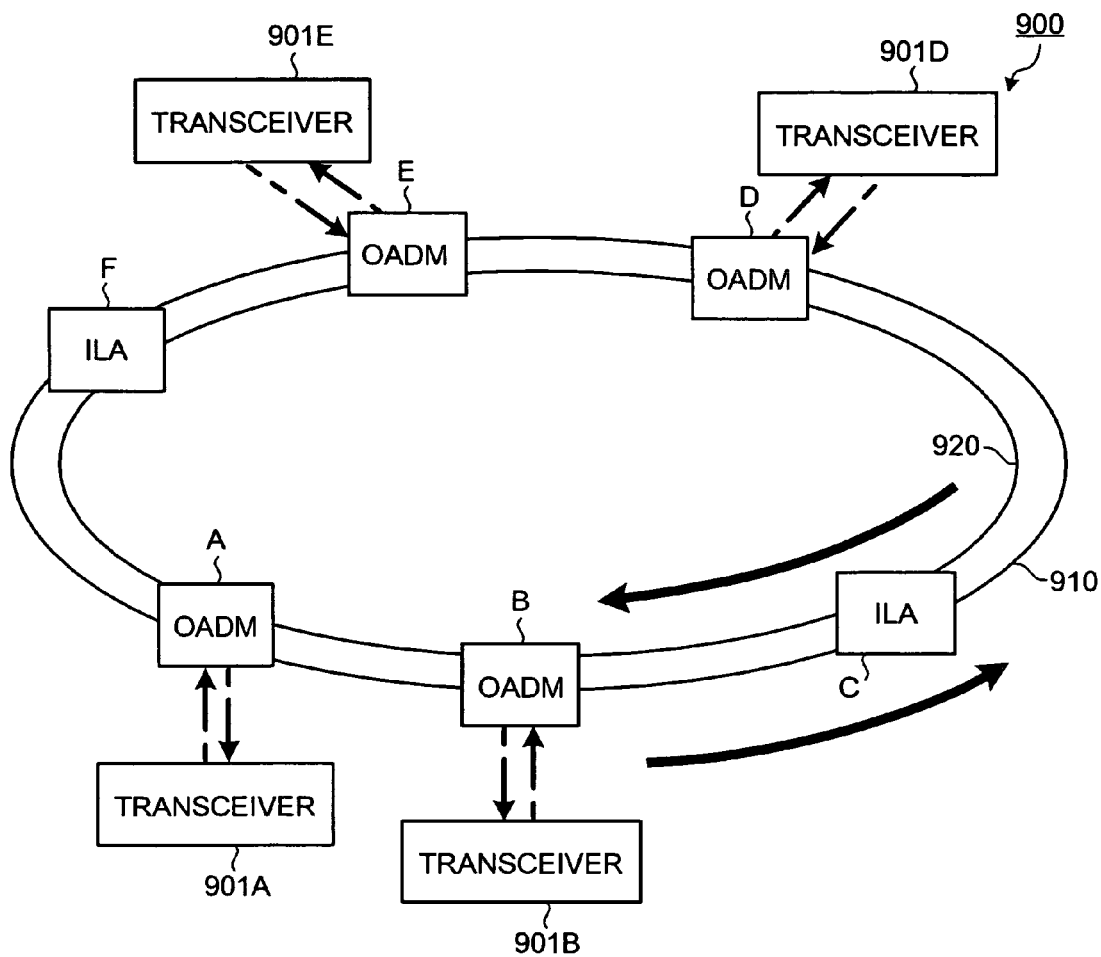
FIG. 9 is an explanatory diagram of a configuration example of an optical transmission system.

FIG. 1 is an explanatory diagram of the configuration of an optical add-and-drop multiplexer (OADM) according to the present invention. The OADM A shown in FIG. 1 constitutes the optical transmission system 900 shown in FIG. 9. As shown in FIG. 1, in the OADM A, the reception unit 1010, a demultiplexer 1020, an add/drop unit 1030, a multiplexer 1040, and the transmission unit 1050 are respectively provided for the outer ring 910 and the inner ring 920. Furthermore, in the OADM A, the OSC controller 1060, a controller 1070, and a converter 1080, which function both for the outer ring 910 and the inner ring 920, are provided.

The reception unit 1010 includes the VOA 1011, the OSC branch coupler 1012, and the preamp 1013. The transmitted light input from the outer ring 910 or the inner ring 920 is attenuated by the VOA 1011, and then branched to the WDM beam and the OSC beam by the OSC branch coupler 1012.

The OSC beam branched by the OSC branch coupler 1012 is input to the OR 1061 in the OSC controller 1060. When the input OSC beam indicates a normal optical transmission state, the OSC controller 1060 is turned to a waiting state. On the other hand, when the input OSC beam indicates abnormality in the transmission path, or a change in the transmission state such as an increase or decrease in the wavelengths of optical signals multiplexed in the WDM beam, the OSC controller 1060 outputs an instruction to the controller 1070 to handle the situation by performing a process corresponding to the changed situation.

Figure 10:
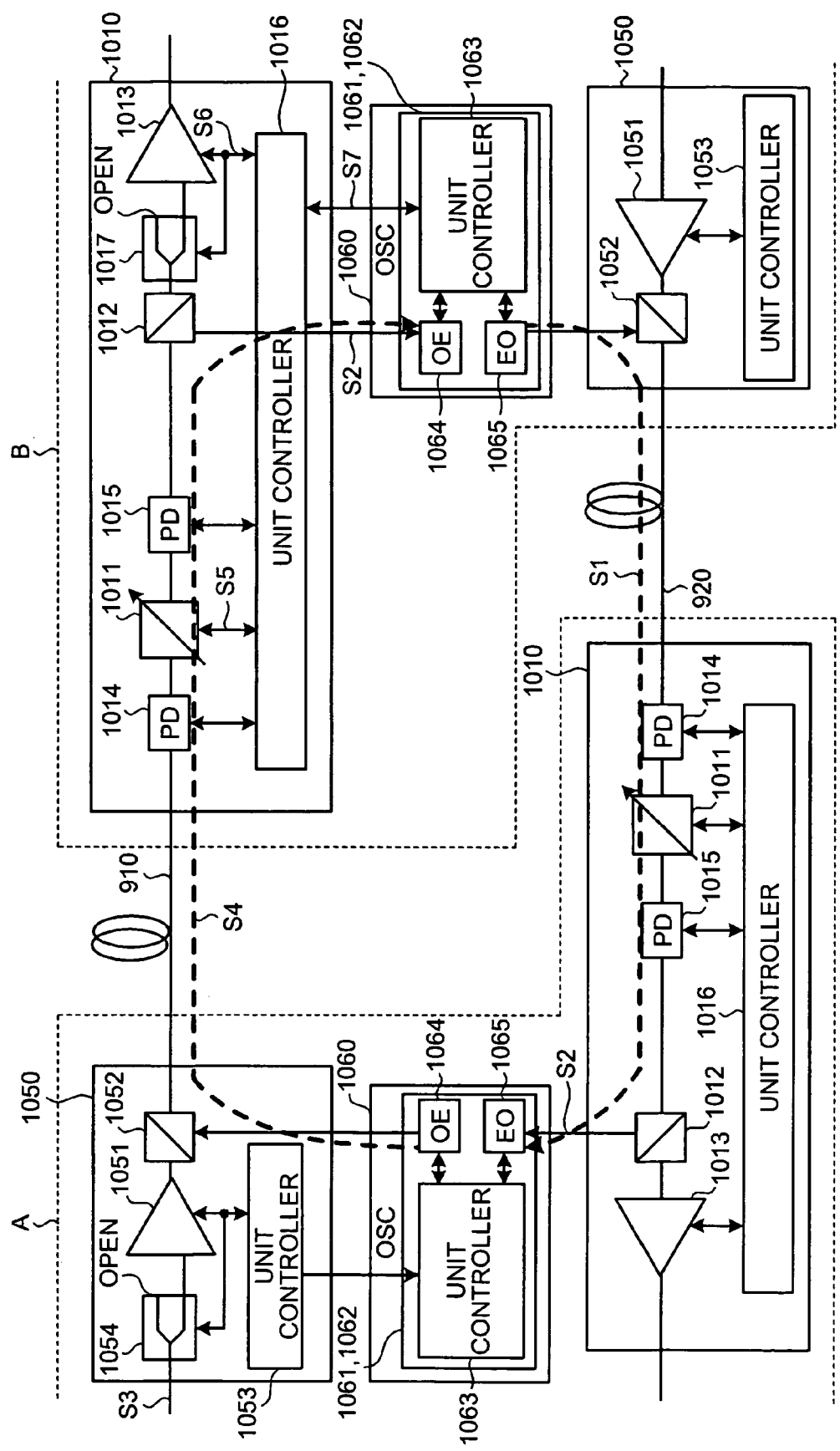
FIG. 10 is an explanatory diagram of a startup procedure of the optical transmission system.

The OSC beam branched by the reception unit 1010 in the outer ring 910, and instructing a process corresponding to the OSC beam input to the OSC controller 1060 is output to the transmission unit 1050 in the inner ring 920. Likewise, the OSC beam branched by the reception unit 1010 in the inner ring 920, and instructing a process corresponding to the OSC beam input to the OSC controller 1060 is output to the transmission unit 1050 in the outer ring 910. This is for transmitting the OSC beam, which is a control signal, to the optical transmission unit (OADM, ILA) on a preceding stage by outputting the OSC beam to the ring network in the opposite direction. As a specific use example of the OSC beam, it can be used at the time of a startup process of the optical transmission system 900 explained with reference to FIG. 10.

The WDM beam branched by the OSC branch coupler 1012 is input to the preamp 1013. The WDM beam is amplified by the preamp 1013, and output to the demultiplexer 1020. The demultiplexer 1020 branches the input WDM beam for each wavelength, and output to the add/drop unit 1030.

The add/drop unit 1030 drops an optical signal addressed to the transceiver 901A from the optical signal for each wavelength input from the demultiplexer 1020, and outputs the optical signal to the converter 1080. Optical signals other than the optical signal dropped by the add/drop unit 1030 are transmitted directly, and input to the multiplexer 1040. On the other hand, the optical signal input from the transceiver 901A is added to the add/drop unit 1030 via the converter 1080. The newly added optical signal is output to the multiplexer 1040. The multiplexer 1040 couples the optical signals input from the add/drop unit 1030 by transmission or addition, and outputs the optical signals as one WDM beam to the transmission unit 1050.

The converter 1080 includes a 2×1 switch 1081, an optoelectronic converter (O/E) 1082, an electro-optic converter (E/O) 1083, and a 1×2 coupler 1084. When the optical signal addressed to the transceiver 901A is included in the WDM beam of the transmitted light flowing on the outer ring 910 or the inner ring 920, the optical signal is input to the converter 1080 from the add/drop unit 1030. The optical signal input to the converter 1080 is selected by the 2×1 switch 1081, and output to the O/E 1082. The O/E 1082 converts the input optical signal to an electric signal and output the electric signal to the transceiver 901A.

When the optical signal is transmitted from the transceiver 901A to the transceiver 901B, an electric signal is input to the E/O 1083 in the converter 1080. The input electric signal is converted to an optical signal by the E/O 1083, and output to the 1×2 coupler 1084. The 1×2 coupler 1084 branches the optical signal input from the E/O 1083 into two signals, and outputs the respective optical signals to the add/drop unit 1030 for the outer ring 910 and the add/drop unit 1030 for the inner ring 920.

The transmission unit 1050 includes the postamp 1051 and the OSC combination coupler 1052. The WDM beam input from the multiplexer 1040 is input to the postamp 1051. The postamp 1051 amplifies the input WDM beam and outputs the WDM beam to the OSC combination coupler 1052. The OSC combination coupler 1052 couples the WDM beam input from the postamp 1051 and the OSC beam input from the OSC controller 1060 and outputs the OSC beam as a transmission light to the outer ring 910 or the inner ring 920.

The OSC controller 1060 includes the OR 1061 having a reception function and the OS 1062 having a transmission function. The OSC controller 1060 controls the controller 1070. The OSC beam branched by the OSC branch coupler 1012 in the reception unit 1010 is input to the OSC controller 1060 by the OR 1061. An instruction content of the OSC beam is output from the OSC controller 1060 to the controller 1070. An instruction content to another OADM is input to the OS 1062 from the controller 1070 and output to the OSC combination coupler 1052 in the transmission unit 1050 as the OSC beam.

The basic configuration of the OADM A, B, D, or E is as described above. The ILA C or F has a configuration in which the demultiplexer 1020, the add/drop unit 1030, the multiplexer 1040, and the converter 1080 are removed from the configuration of the OADM A, B, D, or E, that is, a configuration in which transmission of optical signals is not carried out between the transceiver 901A and the ILA C or F.

Figure 2:
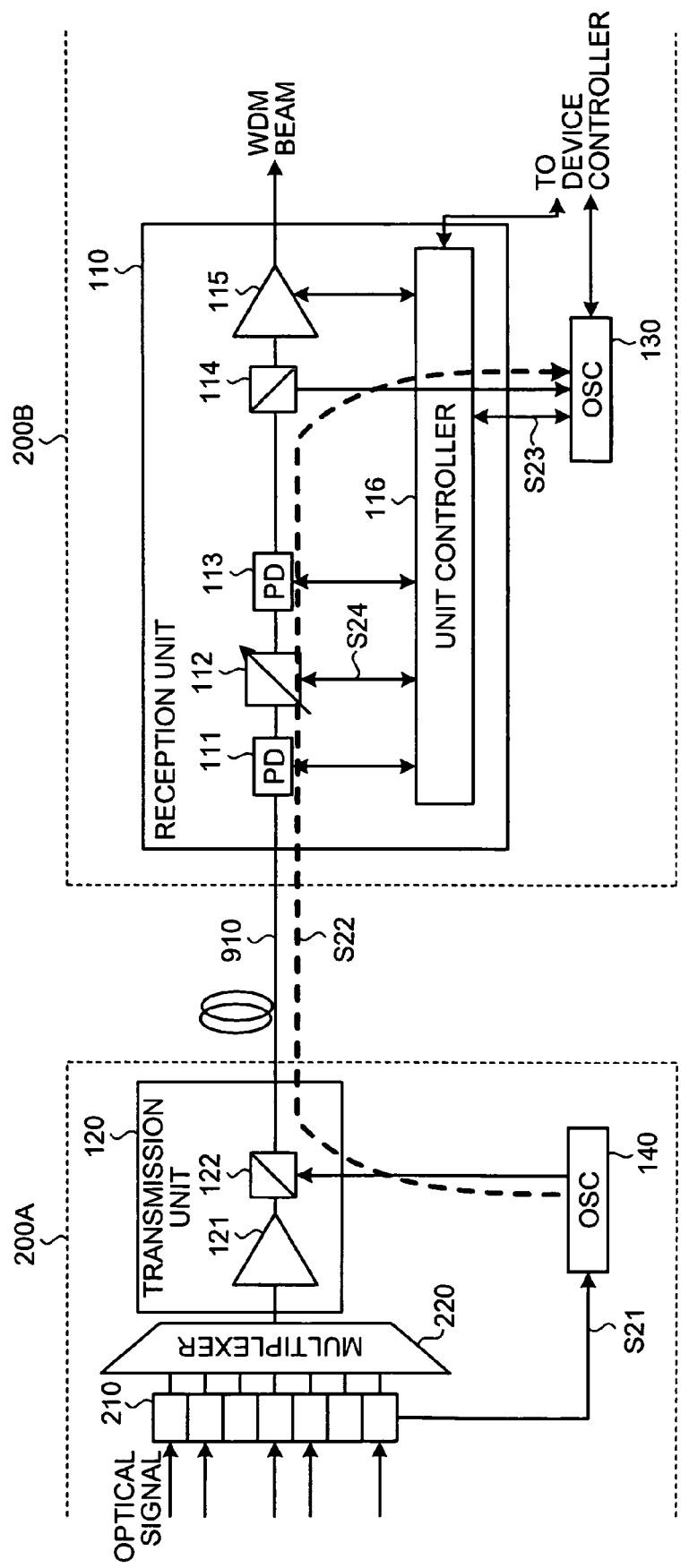
FIG. 2 is an explanatory diagram of the configuration of an optical transmission device according to a first embodiment of the present invention.

FIG. 2 is an explanatory diagram of the configuration of an optical transmission device according to a first embodiment of the present invention. An optical transmission device 200A/200B according to the first embodiment has a configuration in which a unit controller 116 and a preamp 115 having a PD are included in a reception unit 110 of a general optical transmission device such as the OADM and the ILA, and is connected to an adjacent optical transmission device 200A/200B by the outer ring 910.

The reception unit 110 includes a front PD 111, a VOA 112, a rear PD 113, an OSC branch coupler 114, the preamp 115 with the PD, and the unit controller 116. The OSC branch coupler 114 and the unit controller 116 in the reception unit 110 are connected to an OSC controller 130.

A transmission unit 120 includes a postamp 121 and an OSC combination coupler 122. A multiplexer 220 is arranged upstream of the transmission unit 120, and a PD array 210 is arranged upstream of the multiplexer 220. The OSC combination coupler 122 in the transmission unit 120 and the PD array 210 are connected to an OSC controller 140.

The operation when the transmission light is transmitted from the optical transmission device 200A to the optical transmission device 200B is explained. An optical signal branched for each wavelength due to add or drop by the add/drop unit 1030 shown in FIG. 1 is input to the PD array 210. The PD array 210 detects wavelength information of the transmitted optical signal and outputs the wavelength information to the OSC controller 140 (S21). The optical signal transmitted through the PD array 210 is input to the multiplexer 220. The input optical signal is coupled with optical signals of other wavelengths, and output as a WDM beam to the transmission unit 120.

The WDM beam input to the transmission unit 120 is amplified by the postamp 121, and output to the OSC combination coupler 122. An OSC beam (S22) has been input to the OSC combination coupler 122 from the OSC controller 140, and the WDM beam input from the postamp 121 is coupled with the OSC beam, and output as a transmission light to the outer ring 910. The OSC beam (S22) output from the OSC controller 140 includes the wavelength information detected by the PD array 210.

The transmission light output from the optical transmission device 200A is input to the optical transmission device 200B via the outer ring 910. The transmission light input to the optical transmission device 200B is input, via the front PD 111, the VOA 112, and the rear PD 113, to the OSC branch coupler 114 to be branched to the WDM beam and the OSC beam (S22). The front PD 111 and the rear PD 113 detect the optical level of the transmission light, to calculate the attenuation by the VOA 112. The attenuation is input to the unit controller 116, and is used for adjustment of the attenuation by the VOA 112 (at the time of normal operation, the attenuation by the VOA 112 is fixed to a value adjusted at the time of startup).

The OSC beam (S22) branched by the OSC branch coupler 114 is input to the OSC controller 130. The WDM beam branched by the OSC branch coupler 114 is input to the preamp 115. The preamp 115 is provided with the PD, and the detection result of the PD is output to the unit controller 116 at all times. The OSC controller 130 obtains the wavelength information from the input OSC beam and the supervisory information indicating whether the transmission path is normal, and output these pieces of information to the unit controller 116 (S23). A target table (not shown) is stored in the unit controller 116, in which information of an optimum optical level (target) of the optical signal multiplexed to the WDM beam input to the respective functional units (111 to 115) in the reception unit 110 is recorded. Therefore, the unit controller 116 calculates the optical level of the optical signal based on the information input from the OSC controller 130, by referring to the target table, and when the optical level of the optical signal increases or decreases as compared to the optical level at the time of startup or at the time of normal operation, the unit controller 116 instructs adjustment of the attenuation to the VOA 112 (S24).

Thus, in the first embodiment, even when the transmission characteristic changes, the optical level can be adjusted to an appropriate level, by having the PD array 210 and adding the wavelength information detected by the PD array 210 to the OSC beam.

Figure 3:
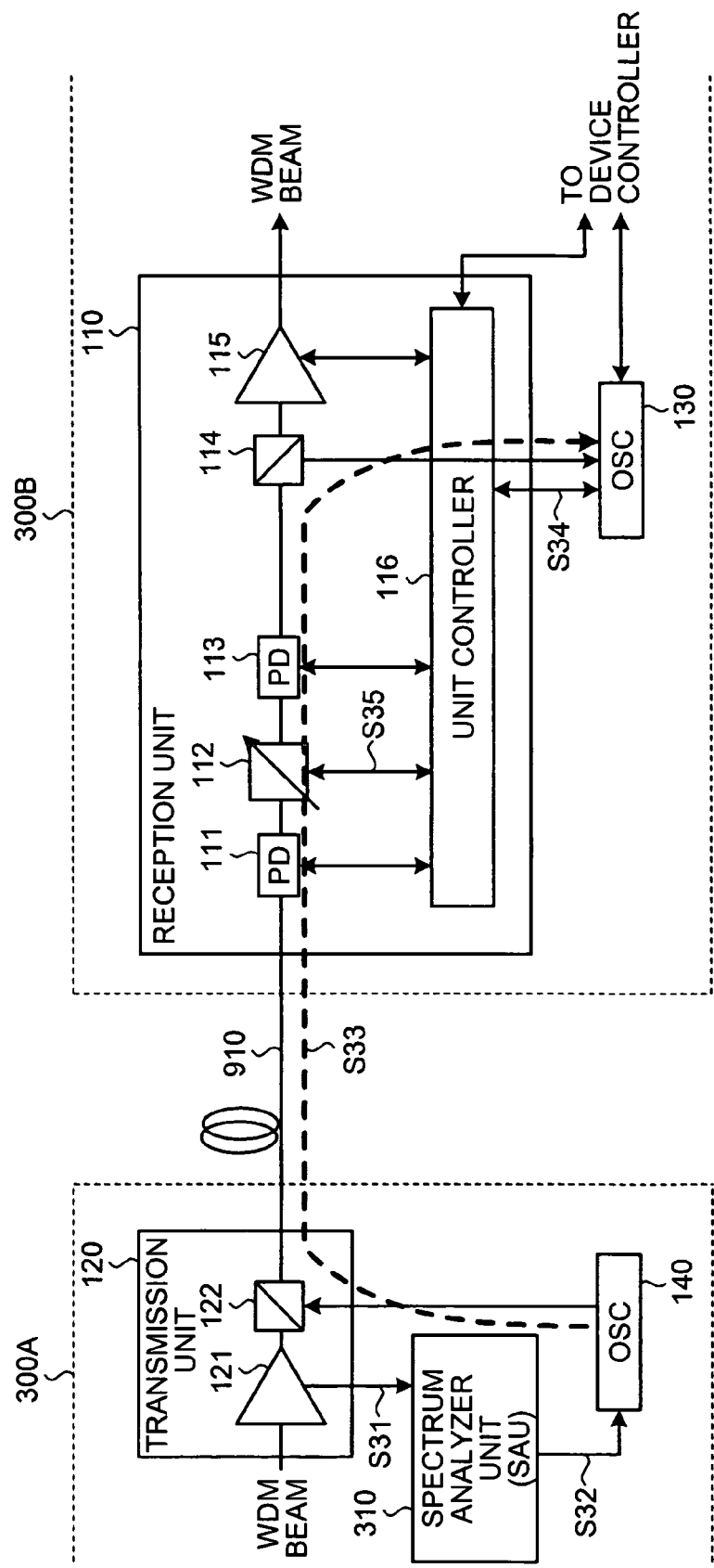
FIG. 3 is an explanatory diagram of the configuration of an optical transmission device according to a second embodiment of the present invention.

FIG. 3 is an explanatory diagram of the configuration of an optical transmission device according to a second embodiment of the present invention. As shown in FIG. 3, in an optical transmission device 300A/300B according to the second embodiment, a spectrum analyzer unit (SAU) 310, which is a wavelength analyzer connected to the postamp 121, is provided instead of the PD array 210 in the optical transmission device 200A/200B.

The operation at the time of transmitting the transmission light from the optical transmission device 300A to the optical transmission device 300B is explained next. At first, the postamp 121 amplifies the WDM beam input thereto, branches a part of the WDM beam, and outputs the branched part to the SAU 310 (S31). The SAU 310 detects the wavelength information and channel level information from the WDM beam, and outputs the detected information to the OSC controller 140 (S32). The OSC controller 140 outputs the OSC beam including the wavelength information and the channel level information to the optical transmission device 300B (S33).

The transmission light output from the optical transmission device 300A is input to the optical transmission device 300B via the outer ring 910. The transmission light is branched to the WDM beam and the OSC beam (S33) by the OSC branch coupler 114, and the OSC beam (S33) is input to the OSC controller 130. The OSC controller 130 obtains the wavelength information and the channel level information from the input OSC beam, and the supervisory information of the transmission path, and output these pieces of information to the unit controller 116 (S34). A target table (not shown) is stored in the unit controller 116, in which information of an optimum optical level (target) of the optical signal multiplexed to the WDM beam input to the respective functional units (111 to 115) in the reception unit 110 is recorded. Therefore, the unit controller 116 calculates the optical level of the optical signal based on the information input from the OSC controller 130, by referring to the target table, and when the optical level of the optical signal increases or decreases as compared to the optical level at the time of startup or at the time of normal operation, the unit controller 116 instructs adjustment of the attenuation to the VOA 112 (S35).

Thus, in the second embodiment, even when the transmission characteristic changes, the optical level can be adjusted to an appropriate level, by having the SAU 310 and adding the wavelength information detected by the SAU 310 and the channel level information to the OSC beam.

Figure 4:
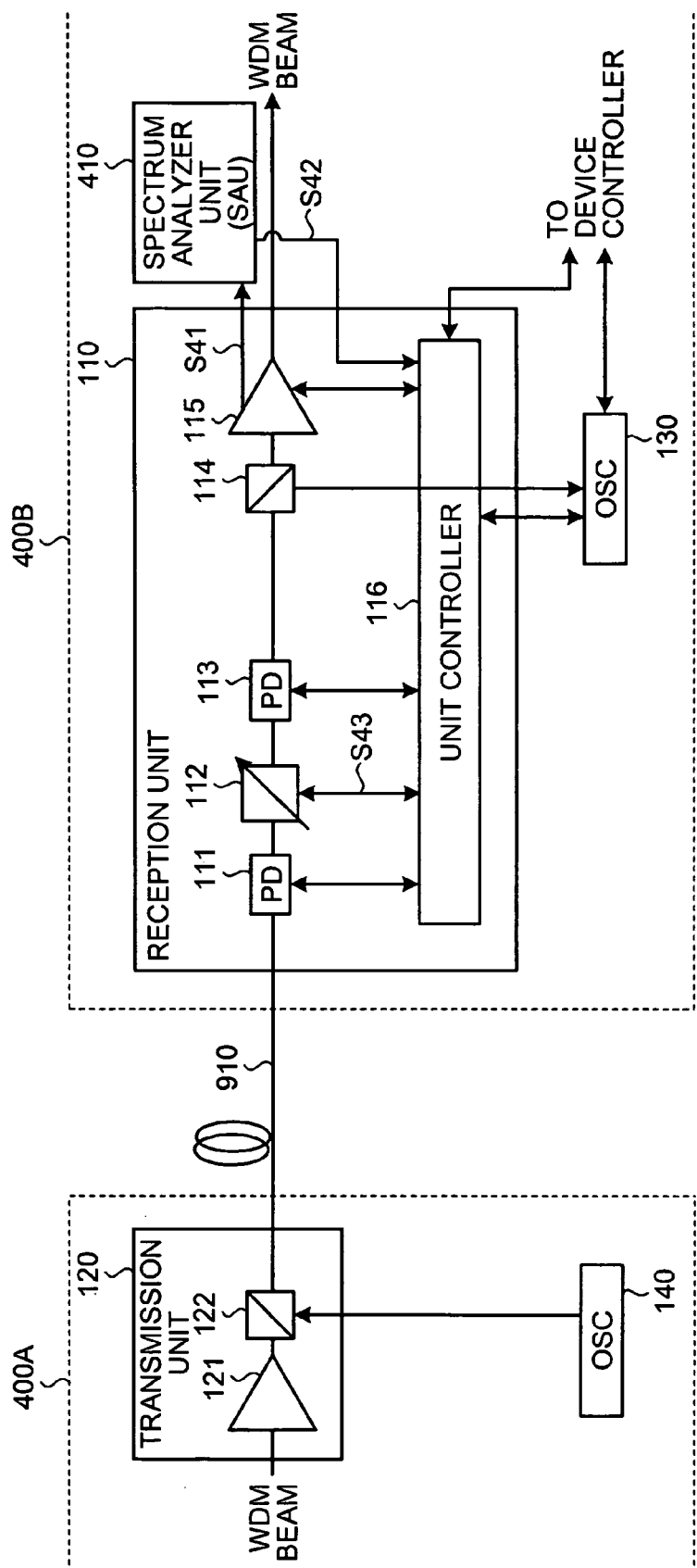
FIG. 4 is an explanatory diagram of the configuration of an optical transmission device according to a third embodiment of the present invention.

FIG. 4 is an explanatory diagram of the configuration of an optical transmission device according to a third embodiment of the present invention. As shown in FIG. 4, in an optical transmission device 400A/400B according to the third embodiment, an SAU 410 is newly connected to the preamp 115 in the reception unit 110. In the transmission unit 120, the SAU 310 is not provided, and the transmission unit 120 does not have a function of detecting the information such as the wavelength information.

The operation at the time of transmitting the transmission light from the optical transmission device 400A to the optical transmission device 400B is explained next. At first, a transmission light in which the WDM beam and the OSC beam are combined is output from the optical transmission device 400A. The transmission light is input to the optical transmission device 400B via the outer ring 910. The transmission light is branched to the WDM beam and the OSC beam by the OSC branch coupler 114. The branched WDM beam is output to the preamp 115, and the OSC beam is output to the OSC controller 130.

The preamp 115 amplifies the input WDM beam, branches a part of the WDM beam, and outputs the branched beam to the SAU 410 (S41). The SAU 410 detects the wavelength information from the input WDM beam, and outputs the wavelength information to the unit controller 116 (S42). A target table (not shown) is stored in the unit controller 116, in which information of an optimum optical level (target) of the optical signal multiplexed to the WDM beam input to the respective functional units (111 to 115) in the reception unit 110 is recorded. Therefore, the unit controller 116 calculates the optical level of the optical signal based on the information input from the SAU 410, by referring to the target table, and when the optical level of the optical signal increases or decreases as compared to the optical level at the time of startup or at the time of normal operation, the unit controller 116 instructs adjustment of the attenuation to the VOA 112 (S43).

Thus, in the third embodiment, since the SAU 410 analyzes the wavelength of the WDM beam received by the reception unit 110, detects the wavelength information, and calculates the optical level of the optical signal by referring to the target table, even when the transmission characteristic changes, the optical level can be adjusted to an appropriate level.

Figure 5:
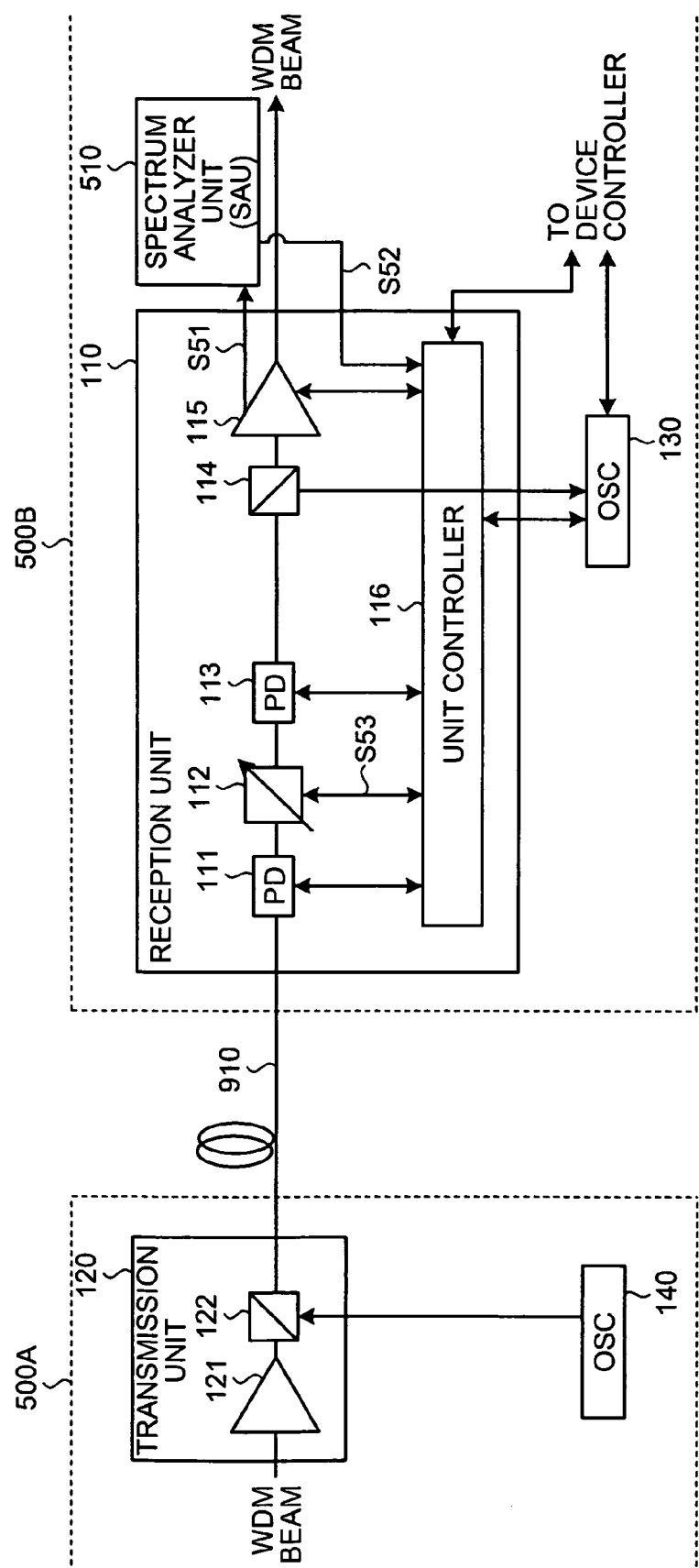
FIG. 5 is an explanatory diagram of the configuration of an optical transmission device according to a fourth embodiment of the present invention.

FIG. 5 is an explanatory diagram of the configuration of an optical transmission device according to a fourth embodiment of the present invention. As shown in FIG. 5, an optical transmission device 500A/500B according to the fourth embodiment has the same configuration as that of the optical transmission device 400A/400B in the third embodiment. In the optical transmission device 500A/500B, when a part of the WDM beam amplified by the preamp 115 is branched and output to an SAU 510 (S51), the SAU 510 detects the optical level of a plurality of multiplexed optical signals from the input WDM beam, and stores the information as profile information of the optical signal. This detection process is performed continuously during operation of the optical transmission device.

When the transmission characteristic of the transmission path changes, to change the optical level of the optical signal input to the optical transmission device 500B, a difference occurs between the profile information of the optical signal stored in the SAU 510 and the newly detected optical level of the optical signal. The SAU 510 carries out differentiation, and outputs difference information to the unit controller 116 (S52). The unit controller 116 instructs adjustment of the attenuation to the VOA 112 based on the difference information input from the SAU 510, so that the optical level of the optical signal becomes equal to the optical level at the time of startup or at the time of normal operation (S53).

Thus, in the fourth embodiment, since the SAU 510 analyzes the wavelength of the WDM beam received by the reception unit 110, and stores the analysis result as profile information of the optical signal, the optical level can be adjusted to an appropriate level by using a difference when there is a change in the optical level, even when the transmission characteristic changes.

Figure 6:
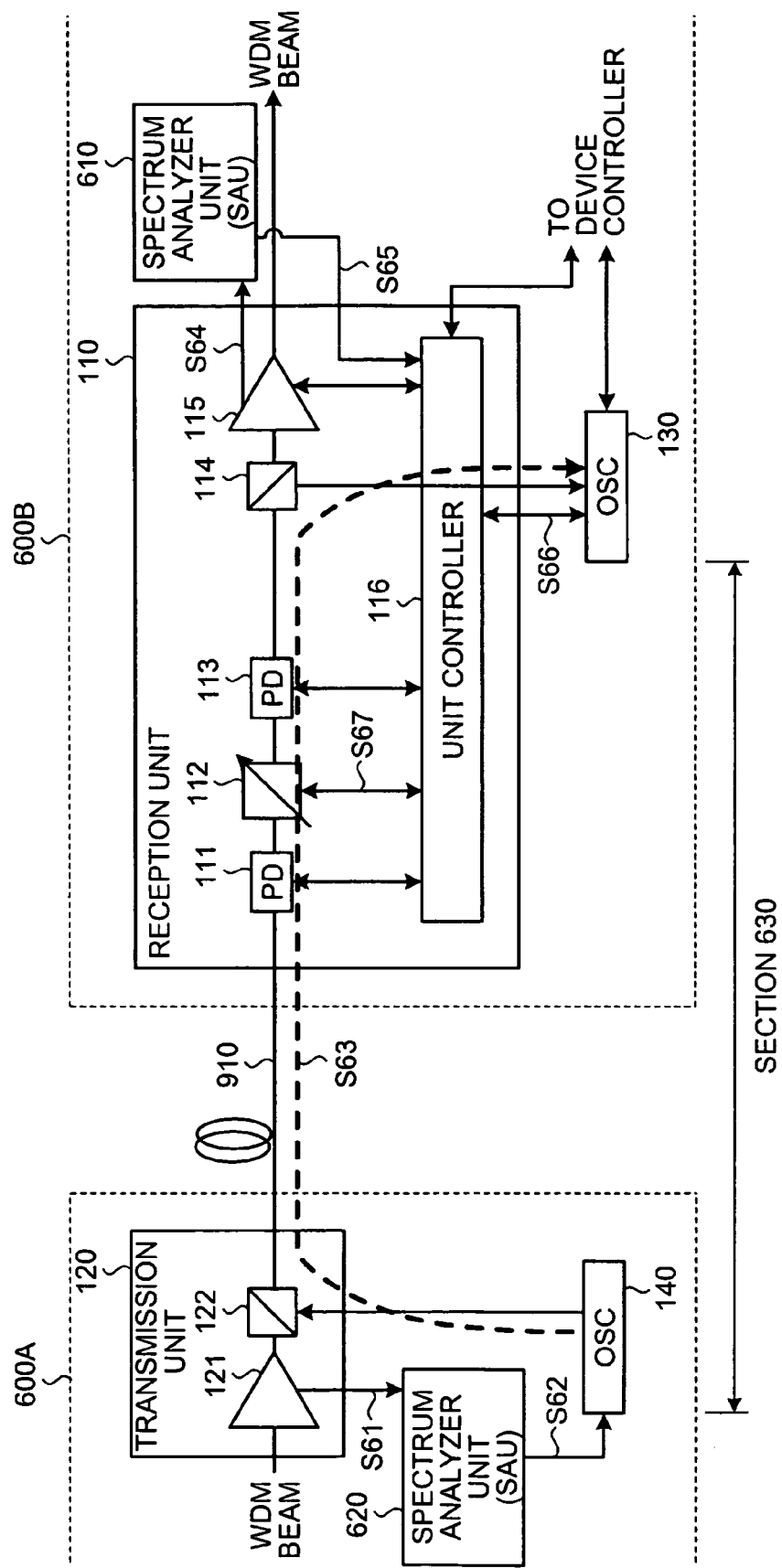
FIG. 6 is an explanatory diagram of the configuration of an optical transmission device according to a fifth embodiment of the present invention.

FIG. 6 is an explanatory diagram of the configuration of an optical transmission device according to a fifth embodiment of the present invention. As shown in FIG. 6, in an optical transmission device 600A/600B according to the fifth embodiment, a SAU 610 is newly connected to the preamp 115 in the reception unit 110, and a SAU 620 is connected to the postamp 121, as in the optical transmission device 300A/300B according to the second embodiment.

The operation at the time of transmitting the transmission light from the optical transmission device 600A to the optical transmission device 600B is explained next. At first, the postamp 121 amplifies the WDM beam input thereto, branches a part of the WDM beam, and outputs the branched beam to the SAU 620 (S61). The SAU 620 analyzes the optical signal in the WDM beam to detect the profile information, and outputs the detected profile information to the OSC controller 140 (S62). The OSC controller 140 outputs the OSC beam including the profile information to the optical transmission device 600B (S63).

The transmission light output from the optical transmission device 600A is input to the optical transmission device 600B via the outer ring 910. The transmission light is branched to the WDM beam and the OSC beam (S63) by the OSC branch coupler 114, and the OSC beam is output to the OSC controller 130. The WDM beam branched by the OSC branch coupler 114 is amplified by the preamp 115, and a part of the WDM beam is branched and input to the SAU 610 (S64).

The SAU 610 detects the optical level of a plurality of multiplexed optical signals from the input WDM beam, and outputs the information to the unit controller 116 as profile information of the optical signal (S65). The OSC controller 130 extracts the profile information from the OSC beam, and outputs the extracted profile information to the unit controller 116 (S66).

The unit controller 116 compares the profile information detected by the SAU 620 in the optical transmission device 600A with the profile information detected by the SAU 610 in the optical transmission device 600B, to calculate a loss in the transmission light in a section 630. Based on the calculation result, the unit controller 116 instructs adjustment of the attenuation to the VOA 112, so that the optical level of the optical signal becomes equal to the optical level at the time of startup or at the time of normal operation (S67).

Thus, in the fifth embodiment, even when the transmission characteristic changes, the optical level can be adjusted to an appropriate level, by respectively connecting the SAU 610 and the SAU 620 to the reception unit 110 and the transmission unit 120, to obtain a loss in a predetermined section 630 including the outer ring 910.

Figure 7:
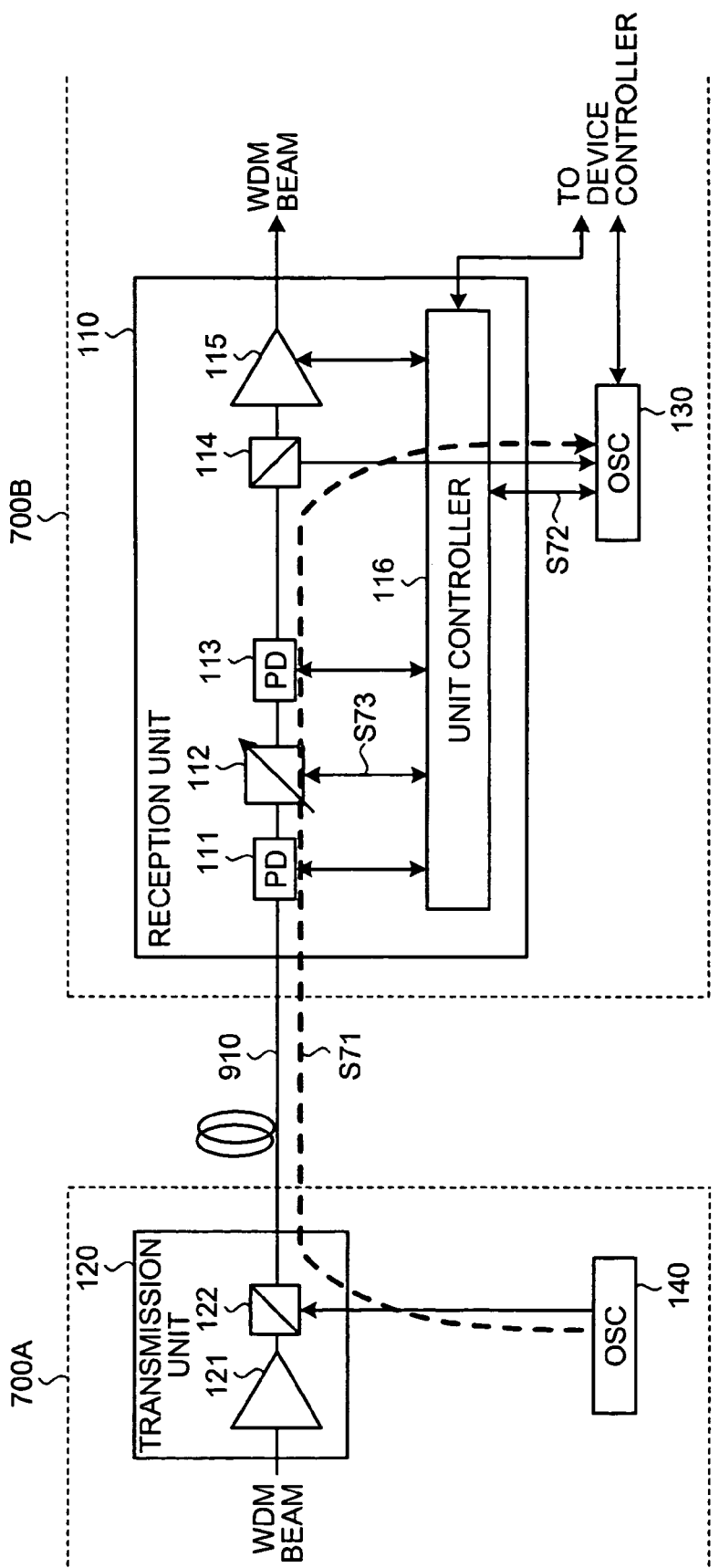
FIG. 7 is an explanatory diagram of the configuration of an optical transmission device according to a sixth embodiment of the present invention.

FIG. 7 is an explanatory diagram of the configuration of an optical transmission device according to a sixth embodiment of the present invention. As shown in FIG. 7, in an optical transmission device 700A/700B according to the sixth embodiment, the OSC controller 130 is connected to the reception unit, and the OSC controller 140 is connected to the transmission unit 120. Different from the first to the fifth embodiments, a new functional unit is not added.

The operation at the time of transmitting the transmission light from the optical transmission device 700A to the optical transmission device 700B is explained next. At first, to set the attenuation of the VOA 112 at the time of startup, the ASE beam is transmitted from the OSC controller 140 to the OSC controller 130 (S71). The OSC controller 130 obtains information of the optical level at the time of outputting the optical signal from the OSC controller 140 in the optical transmission device 700A and the optical level at the time of inputting the optical signal to the OSC controller 130 in the optical transmission device 700B from the input OSC beam (for example, the ASE beam), and outputs the information to the unit controller 116 (S72).

The unit controller 116 calculates a loss at the time of transmission in the outer ring 910 from the information of the optical levels of the obtained two OSC beams. Thereafter, when the normal operation is started, the latest information of the optical level of the OSC beam is input to the OSC controller 130 at all times, and the OSC controller 130 calculates a loss at the time of present transmission in the outer ring 910. When the transmission characteristic changes, there is a change in the loss. When there is a change in the loss, the unit controller 116 calculates a difference in the loss due to the change, and instructs adjustment of the attenuation to the VOA 112 based on the calculation result, so that the optical level of the optical signal becomes equal to the optical level at the time of startup or at the time of normal operation (S73).

Thus, in the sixth embodiment, on the assumption that the OSC beam is in the normal operation state, by determining a change between the OSC beam used at the time of startup and the OSC beam at the time of normal operation, the optical level can be adjusted to an appropriate level even when the transmission characteristic changes.

Figure 8:
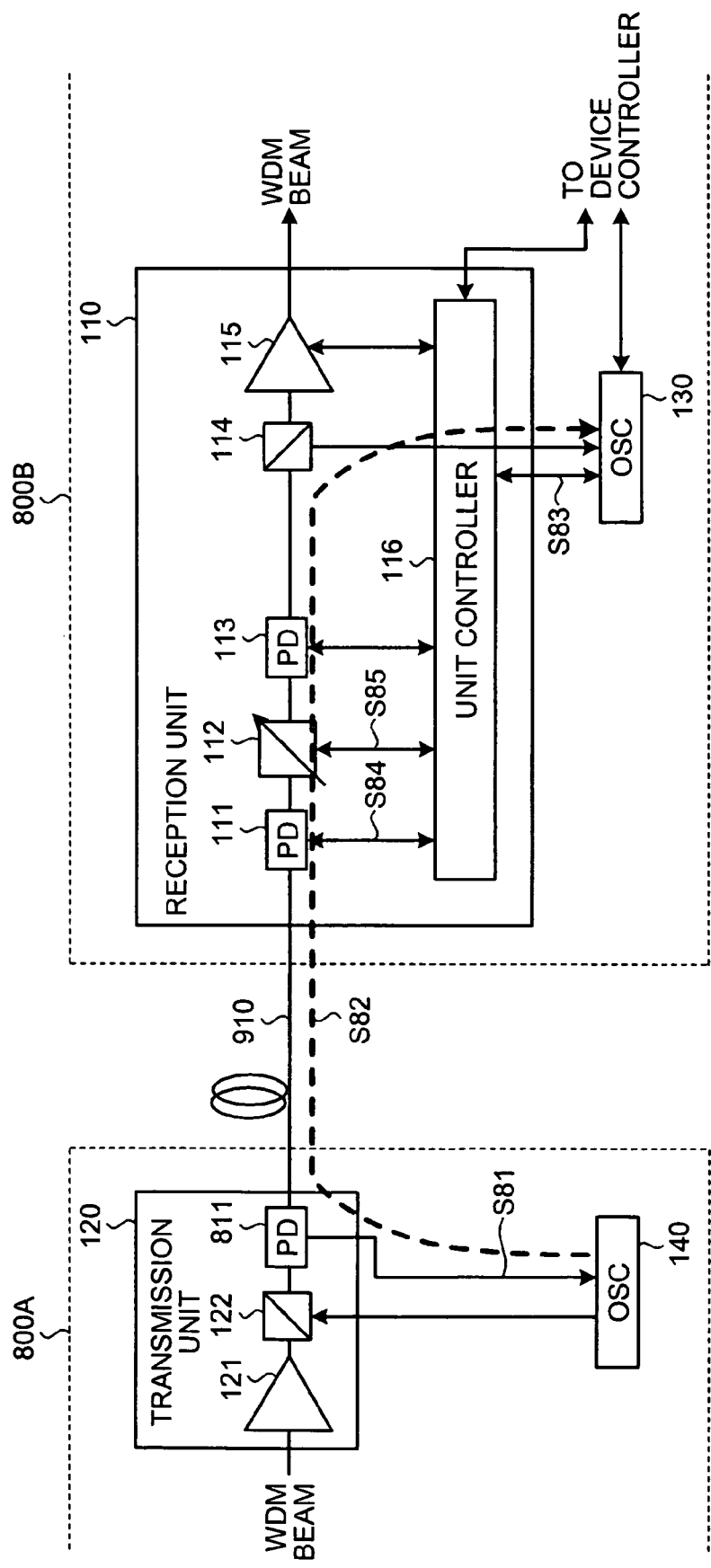
FIG. 8 is an explanatory diagram of the configuration of an optical transmission device according to a seventh embodiment of the present invention.

FIG. 8 is an explanatory diagram of the configuration of an optical transmission device according to a seventh embodiment of the present invention. As shown in FIG. 8, in an optical transmission device 800A/800B according to the seventh embodiment has a configuration in which a PD 811 is added to the transmission unit 120 in the optical transmission device 700A/700B shown in the sixth embodiment. The operation at the time of transmitting the transmission light from the optical transmission device 800A to the optical transmission device 800B is explained next. At first, the OSC beam output from the OSC controller 140 for adjusting the VOA 112 at the time of startup is input to the PD 811 via the OSC combination coupler 122.

The PD 811 detects the optical level of the OSC beam, and outputs the optical level to the OSC controller 140 (S81). The OSC controller 140 outputs the OSC beam including the detected optical level to the optical transmission device 800B (S82). The OSC beam (S82) is input to the OSC controller 130 by the OSC branch coupler 114. The OSC controller 130 extracts the information of the optical level detected by the PD 811 from the input OSC beam, and outputs the information to the unit controller 116 (S83).

When the OSC beam is input to the optical transmission device 800B, the optical level of the OSC beam is detected by the front PD 111, and output to the unit controller 116 (S84). The unit controller 116 calculates a loss at the time of transmission in the outer ring 910 from the information of the optical level of the OSC beam input from the OSC controller 130 and the information of the optical level of the OSC beam input from the front PD 111. Thereafter, when the normal operation is started, the latest information of the optical level of the OSC beam is input to the OSC controller 130 at all times, and the OSC controller 130 calculates a loss at the time of present transmission in the outer ring 910. When the transmission characteristic changes, there is a change in the loss. When there is a change in the loss, the unit controller 116 calculates a difference in the loss due to the change, and instructs adjustment of the attenuation to the VOA 112 based on the calculation result, so that the optical level of the optical signal becomes equal to the optical level at the time of startup or at the time of normal operation (S85).

Thus, in the seventh embodiment, on the assumption that the OSC beam is in the normal operation state, by determining a change between the OSC beam used at the time of startup and the OSC beam at the time of normal operation, the optical level can be adjusted to an appropriate level even when the transmission characteristic changes.

According to the optical transmission devices 200A/200B to 800A/800B, even when the transmission characteristic changes, the optical level can be automatically adjusted to an optimum level.

The optical level control method explained in the embodiments is realized by installing a program prepared beforehand in a computer, for example, an FPGA, or firmware in an AMP unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission device that adjusts a level of an optical signal from an adjacent optical transmission device that is arranged upstream of the optical transmission device on a transmission path, the optical transmission device comprising:
    an attenuator that attenuates the optical signal;
    an optical element that is arranged downstream of the attenuator;
    a detector that detects a change in a characteristic of the transmission path; and
    a controller that adjusts, when the change is detected, an attenuation of the attenuator to keep the level of the optical signal input to the optical element at a predetermined level;
    wherein the detector detects the change in the characteristic of the transmission path by extracting information that is multiplexed on the optical signal by the adjacent optical transmission device; and
    the information indicates a level of each wavelength included in the optical signal or a level of an OSC beam multiplexed on the optical signal.

2. The optical transmission device according to claim 1, wherein the information is acquired by any one of a photodiode array and a wavelength analyzer of the adjacent optical transmission device.

3. The optical transmission device according to claim 1, wherein the information includes any one of wavelength information of the optical signal and channel level information of the optical signal.

4. The optical transmission device according to claim 1, wherein the detector is a wavelength analyzer that is arranged downstream of the optical element.

5. The optical transmission device according to claim 4, wherein the wavelength analyzer stores a plurality of results of analysis of the optical signal, and detects the change in the characteristic of the transmission path by comparing a result that is stored after the change occurs with a result that is stored before the change occurs.

6. The optical transmission device according to claim 1, wherein the optical element is an optical amplifier.

7. A method for an optical transmission device to adjust a level of an optical signal from an adjacent optical transmission device that is arranged upstream of the optical transmission device on a transmission path, the method comprising:

attenuating the optical signal by an attenuator;

detecting a change in a characteristic of the transmission path; and adjusting, when the change is detected, an attenuation of the attenuator to keep the level of the optical signal after being attenuated by the attenuator at a predetermined level;

wherein the detecting includes detecting the change in the characteristic of the transmission path by extracting information that is multiplexed on the optical signal by the adjacent optical transmission device; and the information indicates a level of each wavelength included in the optical signal or a level of an OSC beam multiplexed on the optical signal.

8. A computer-readable recording medium that stores a computer program for an optical transmission device to adjust a level of an optical signal from an adjacent optical transmission device that is arranged upstream of the optical transmission device on a transmission path, wherein the computer program causes the optical transmission device to execute:

attenuating the optical signal by an attenuator;

detecting a change in a characteristic of the transmission path; and adjusting, when the change is detected, an attenuation of the attenuator to keep the level of the optical signal after being attenuated by the attenuator at a predetermined level;

wherein the detecting includes detecting the change in the characteristic of the transmission path by extracting information that is multiplexed on the optical signal by the adjacent optical transmission device; and the information indicates a level of each wavelength included in the optical signal or a level of an OSC beam multiplexed on the optical signal.

* * * * *